(12) United States Patent
Kapelner

(10) Patent No.: US 12,354,380 B2
(45) Date of Patent: Jul. 8, 2025

(54) OPTICAL TRAFFIC LANE RECOGNITION

(71) Applicant: Robert Bosch GmbH, Stuttgart (DE)

(72) Inventor: Tamas Kapelner, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 502 days.

(21) Appl. No.: 17/814,416

(22) Filed: Jul. 22, 2022

(65) Prior Publication Data

US 2023/0029833 A1 Feb. 2, 2023

(30) Foreign Application Priority Data

Jul. 29, 2021 (DE) ...................... 10 2021 208 204.1

(51) Int. Cl.
*G06V 20/56* (2022.01)
*G06V 10/26* (2022.01)
*G06V 10/44* (2022.01)
*G06V 10/774* (2022.01)
*G06V 10/82* (2022.01)
*G06V 20/58* (2022.01)

(52) U.S. Cl.
CPC ............ *G06V 20/588* (2022.01); *G06V 10/26* (2022.01); *G06V 10/44* (2022.01); *G06V 10/7747* (2022.01); *G06V 10/82* (2022.01); *G06V 20/584* (2022.01)

(58) Field of Classification Search
CPC ...... G06V 20/588; G06V 10/26; G06V 10/44; G06V 10/7747; G06V 10/82; G06V 20/584
See application file for complete search history.

(56) References Cited

U.S. PATENT DOCUMENTS

| | | | | |
|---|---|---|---|---|
| 9,592,829 B2 * | 3/2017 | Roelke | ................ | B60W 30/12 |
| 2017/0017846 A1 * | 1/2017 | Felemban | ............. | G06V 20/53 |
| 2017/0363741 A1 * | 12/2017 | Send | ................... | G01S 7/4816 |
| 2018/0204335 A1 * | 7/2018 | Agata | .................. | H04N 23/62 |
| 2022/0035022 A1 * | 2/2022 | Alliot | ................... | G01S 13/867 |
| 2023/0370709 A1 * | 11/2023 | Ozone | ................... | G06V 10/75 |
| 2024/0203273 A1 * | 6/2024 | Mere | ...................... | G08G 5/21 |

FOREIGN PATENT DOCUMENTS

DE 103 45 802 A1 4/2005

* cited by examiner

*Primary Examiner* — Mia M Thomas
(74) *Attorney, Agent, or Firm* — Maginot, Moore & Beck LLP

(57) ABSTRACT

A method for detecting at least one linear object in an input image is disclosed. The input image, and/or an extract of the input image, is fed to an image classifier, which classifies specified regions of the input image or extract in each case at least into relevant regions, the center of which lies in fairly close proximity to the center point of at least one linear object passing at least partially through this region, and background regions where this is not the case. For the relevant regions, coordinates are acquired from a regression which indicate at least one local course of the linear object in the relevant regions. From these coordinates, the course of the linear object is evaluated in the entire input image.

15 Claims, 3 Drawing Sheets

OPTICAL TRAFFIC LANE RECOGNITION

This application claims priority under 35 U.S.C. § 119 to application no. DE 10 2021 208 204.1, filed on Jul. 29, 2021 in Germany, the disclosure of which is incorporated herein by reference in its entirety.

TECHNICAL FIELD

The disclosure relates to the detection of linear objects that can delimit the traffic lane in which a vehicle is driving by means of input images.

BACKGROUND

One of the basic tasks when driving vehicles on the road is to move the vehicle in a marked traffic lane. This requires the vehicle to be able to detect this marked traffic lane on the road. It may also be necessary to detect short-term temporary changes due to construction sites that are marked in a different color (e.g. yellow) and override existing markings in other colors (e.g. white).

A method for traffic lane recognition is known from DE 103 45 802 A1, which derives the number of existing lanes and the lane currently in use by the own vehicle by, inter alia, detecting other road users in the vicinity of the own vehicle.

SUMMARY

Within the scope of the disclosure, a method was developed for detecting at least one linear object in an input image. This linear object can comprise, for example
- a carriageway boundary, traffic lane boundary or guideline that is marked on a lane by coloring and/or as a row of studs; and/or
- a structural boundary of a traffic line; and/or
- a stop line in front of a stop sign or traffic light.

Linear objects to be detected are therefore not restricted solely to objects that run along the direction of travel of a vehicle on the road.

As part of the method, the input image and/or an extract of the input image is fed to an image classifier. This image classifier classifies specified regions of the input image or extract, such as cells arranged in a regular grid, at least into
- relevant regions, the center of which lies in close proximity to the center point of at least one linear object passing at least partially through this region, and
- background regions where this is not the case.

The center point of the linear object in this case means the center point of the entire course of this object in the input image, and not merely the center point of the portion of this course that intersects the region currently being viewed.

For the relevant regions, coordinates are acquired from a regression which indicate at least one local course of the linear object in the respective relevant regions. From these coordinates, the course of the linear object in the entire input image is evaluated.

It has been recognized that an ensemble consisting of an image classifier and a regression can be better trained to recognize linear objects than a regression alone.

Without the additional image classifier, the regression would also need to be provided with some kind of specification, in the form of target coordinates that the regression should output, even for image regions that do not contain a portion of a linear object. A set of zero coordinates could be motivated for this if necessary. Therefore, large portions of the input image would need to be mapped to zero coordinates as target coordinates, and only small portions of the input image would be mapped to actual coordinates through which the linear object passes. This is somewhat self-contradictory, which makes it difficult to train the regression. In particular, it would encourage the regression to introduce artifacts into the determined coordinates in order to "somehow compensate for" the two contradictory modes of the training data.

The image classifier arranged upstream in the method will then ensure that the regression only ever needs to be consulted if a region of the input image has been found to be relevant. At the same time, these are the regions in which the regression can be straightforwardly trained to provide meaningful values for coordinates. This means, conversely, that the regression needs only to be trained to output meaningful coordinates for these image regions.

In particular, these coordinates can be specified relative to a reference point of the respective region under consideration, such as a corner point or a center point of the corresponding cell. The coordinates are then independent of the position of this cell in the entire input image. Thus, the regression can examine the region (such as the cell) as such and does not even need to know where that region is located in the input image.

In this context, it is particularly advantageous to focus on the center point of the linear object when identifying the relevant regions. From this starting point, the course of the linear object in both directions can be reconstructed with good accuracy using the coordinates obtained from the regression.

Specifically, the coordinates obtained from the regression can comprise location coordinates of points through which the linear object passes. This facilitates the training to the extent that, for example when manually labeling training input images, it is possible to define several points along the course of a linear object relatively fast and with little error. However, other coordinates can also be used, such as a combination of a point and an angle.

The course of the linear object in the entire input image can be evaluated, for example, on the basis of a single relevant region that has received the highest classification score as a relevant region. This highest classification score is correlated with the center point of the region being closest to the center point of the linear object in the entire input image. In this way, double detections of the same linear object can be avoided ("non-maximum suppression"). However, the coordinates determined for a plurality of relevant regions can also be aggregated to form the course of the linear object in the entire input image. In certain applications, this can allow the quantitative recognition error to be reduced at the cost of potential double recognitions.

In a further particularly advantageous embodiment, the classifier further classifies the specified regions of the input image or extract into different types of relevant regions corresponding to different types of linear objects. For example, different types of lines used to mark lane boundaries will thus signal different instructions and prohibitions. A dashed carriageway boundary may be crossed for changing lane or overtaking, but a continuous or double continuous traffic lane boundary may not be. A thick guideline, in turn, allows faster driving on the right than on the left. Markings in construction sites, for example marked in yellow, have the highest priority over all other markings.

In a particularly advantageous embodiment, a shared neural network is chosen as the classifier and as the regression. For example, such a network may include a portion that is shared by the classifier and the regression, which creates a precursor that can be used by both the classifier and the regression. For example, an arrangement of convolution layers in which one or more filter cores are applied generates one or more feature maps that can be used universally for the evaluation. These feature maps can then be fed into different network parts ("heads") that implement the specific functionality of the classifier or regression.

By sharing a portion of the network, the overall network contains fewer parameters overall than a concatenation of a classifier and a regression. This makes the network faster and simpler to train. Also, the detection of linear objects with the network is faster because only one network needs to be traversed in the forward direction.

In a further advantageous embodiment, it is checked whether two linear objects are detected in the input image running parallel to each other a distance apart that is compatible with the width of a traffic lane. If this is the case, these two linear objects are evaluated as boundaries of a traffic lane. This is based on the consideration that inaccuracies or systematic errors are likely to affect both objects differently, at least to a certain extent, so that the parallelism is lost and/or the distance between the two objects is changed.

As explained earlier, an important application for the detection of linear objects is in the lane guidance of at least partially automated vehicles. Therefore, in a further particularly advantageous embodiment, a control signal is determined from the evaluated course of at least one linear object in the input image. A vehicle is controlled with this control signal. In this context, the improved accuracy in the detection of linear objects has the effect that the vehicle is highly likely to stay in the correct lane and will not suddenly change lanes, for example, even in complex traffic situations such as on major intersections or in construction sites with a large number of lane markings.

The disclosure also provides a method for training a neural network for use in the previously described method.

As part of the method, training input images with linear objects are provided. These training input images are labeled with points through which the respective linear object passes. As previously explained, this type of label can be entered very quickly and easily, for example, in a manual labeling process. It is easier and faster to click on a series of points on a linear object shown in the training input image than, for example, to adjust a line so that it exactly follows the course of the linear object. In particular, errors and uncertainties in setting the points will at least partially average out over the total length of the linear object. One source of uncertainties, for example, is that many linear objects have a finite width.

From the points through which each linear object passes, the center point of the linear object in the training input image is evaluated.

Specified regions of the training input image will be
 assigned a target classification as the relevant region in response to the fact that the distance of its center point from the center point of the linear object does not exceed a specified threshold and
 are otherwise assigned a target classification as background.

The labels provided in the form of points are thus translated into classification labels that can be processed by the neural network.

For the relevant regions, along the course of the linear object, target coordinates of points through which the linear object passes are sampled relative to a reference point of the relevant region. These are the coordinates to which the regression should ideally map the relevant region.

The neural network maps the training input images onto classification scores and coordinates of points. This means in particular that coordinates of points are also determined for those regions (cells arranged in a grid, for example) of the training input images that are deemed by the neural network to be relevant according to their classification scores. For regions that the neural network has classified as background, no coordinates need to be determined, or coordinates that are supplied by the neural network anyway can be discarded.

A predefined cost function is used to measure the extent to which the classification scores are consistent with the target classification and the coordinates of points are consistent with the target coordinates. In particular, the cost function can therefore include, for example, a first component that measures the correspondence of the classification scores with the target classification and a second component that measures the correspondence of the coordinates determined by regression with the target coordinates. These two values can be weighted relative to each other in any desired way.

Parameters that characterize the behavior of the neural network are optimized with the goal that the evaluation by the cost function is expected to improve as further training input images are processed with the neural network.

In a particularly advantageous embodiment, the cost function evaluates regions with a target classification as background only on the basis of the comparison of the classification scores with this target classification. This takes into account the fact that only regions on a linear object through which this linear object passes can realistically be taken as a basis for determining coordinates. The coordinates that are not required do not even need to be retrieved from the neural network.

In a further advantageous embodiment, the points through which the linear object passes and the coordinates of which are to be used as target coordinates, are sampled equidistantly. This increases the tendency for these points to extend as far as possible along the entire length of the linear object. This reduces the final quantitative error when the precise position of linear objects is evaluated with the fully trained neural network.

In particular, the methods may be fully or partially computer-implemented. Therefore, the disclosure also relates to a computer program with machine-readable instructions which, when executed on one or more computers, cause the computer(s) to execute one of the described methods. In this sense, vehicle control units and embedded systems for technical equipment, which are also capable of executing machine-readable instructions, are also to be considered as computers.

The disclosure also relates to a machine-readable data carrier and/or a download product containing the computer program. A download product is a digital product that can be transmitted over a data network, i.e. downloaded by a user of the data network, and which can be offered for immediate download in an online shop, for example.

Furthermore, a computer can be equipped with the computer program, with the machine-readable data carrier or with the download product.

Further measures to improve the disclosure are described in more detail below, together with the description of the preferred exemplary embodiments of the disclosure by means of figures.

DETAILED DESCRIPTION

Figure 1:
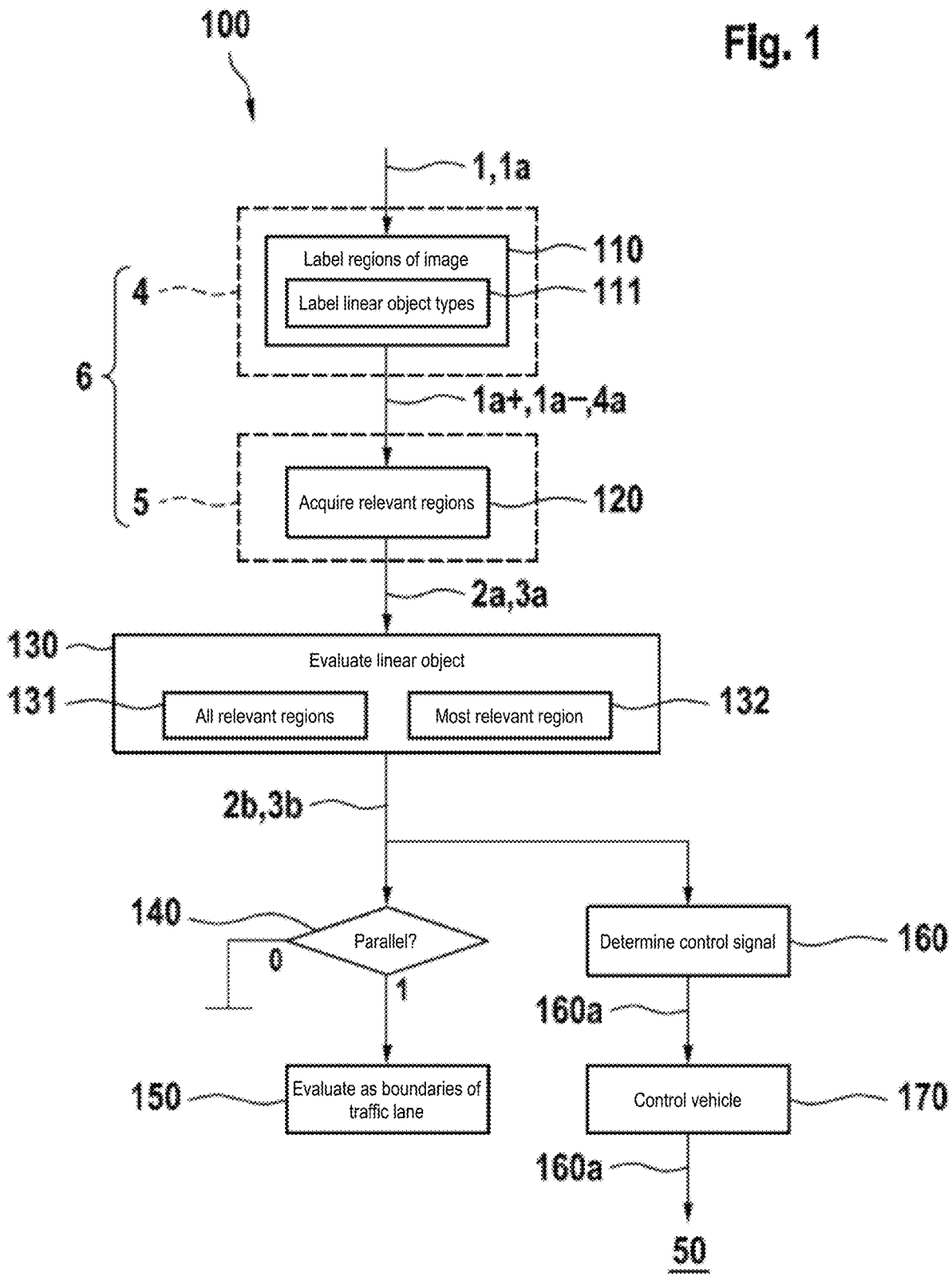
FIG. 1 shows an exemplary embodiment of the method 100 for detecting a linear object 2, 3.

FIG. 1 is a schematic flow diagram of an exemplary embodiment of the method 100 for detecting at least one linear object 2, 3 in an input image 1.

In step 110, the input image 1 is fed to an image classifier 4. The image classifier 4 labels pre-defined regions 1a, such as cells arranged in a grid, of the input image 1 with classification scores 4a indicating whether the respective region 1a is a relevant region 1a+ for the detection of linear objects 2, 3 or a background region 1a−. Relevant regions 1a+ are those regions 1a, the center point of which lies in fairly close proximity to the center point 2c, 3c of at least one linear object 2, 3 passing at least partially through this region 1a.

In accordance with block 111, the classification scores 4a can also specify different types of linear objects 2, 3.

In step 120, for the relevant regions 1a+, coordinates 2a, 3a are acquired from a regression 5, which specify at least one local course of the linear object 2, 3 in the relevant regions 1a+.

From these coordinates 2a, 3a, in step 130 the course 2b, 3b of the linear object 2, 3 in the entire input image 1 is evaluated. For example, according to block 131 coordinates 2a, 3a, which were identified for a plurality of relevant regions 1a+, can be aggregated. However, according to block 132, only the region 1a+ with the highest classification score 4a can be used as a relevant region in order to evaluate the course 2b, 3b from the coordinates 2a, 3a acquired for this region 1a+. For this purpose, for example, a line of best fit can be identified using the coordinates 2a, 3a.

In step 140 it is checked whether two linear objects 2, 3 were detected in the input image 1 running parallel to each other a distance apart that is compatible with the width of a traffic lane. If this is the case (truth value 1), in step 150 these two linear objects 2, 3 are evaluated as boundaries of a traffic lane.

In step 160, a control signal 160a is determined from the evaluated course 2b, 3b of at least one linear object 2, 3 in the input image 1. This can be implemented, for example, in a lane departure warning system or other driving assistance system, or system for at least partially automated driving.

In step 170, a vehicle 50 is controlled with this control signal 160a.

Figure 2:
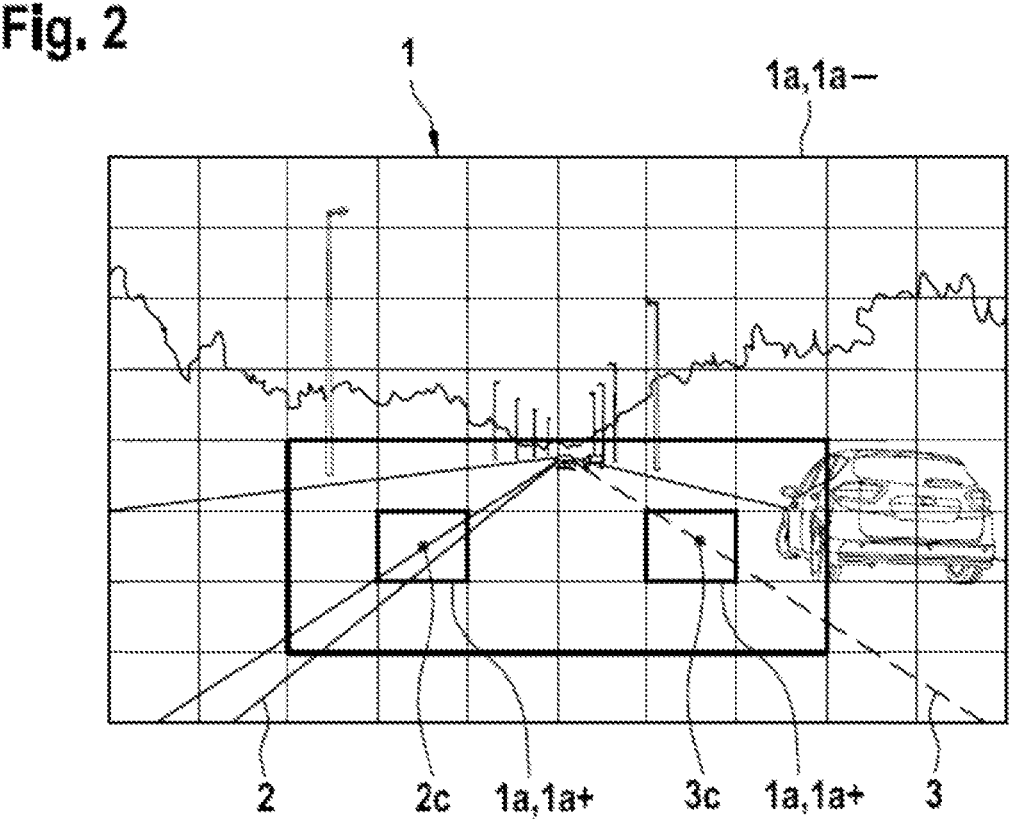
FIG. 2 shows an exemplary detection of two linear objects 2, 3 in an input image 1.

FIG. 2 shows an exemplary input image 1, divided into cells 1a, of a road traffic situation with a double continuous traffic lane boundary as linear object 2 and a dashed traffic lane boundary as linear object 3. The center points 2c, 3c of these linear objects 2, 3 are each closest to the center points of a particularly relevant cell 1a+. The remaining cells 1a are classified as background 1a−. There can also be optional intermediate stages. For example, the neighboring cells of the relevant cells 1a+ can each be classified as of restricted relevance and contribute to the determination of coordinates 2a, 3a with a lower weight.

In the example shown in FIG. 2, the carriageway boundary 2 and the dashed traffic lane boundary 3 run parallel to each other at a distance that is compatible with the width of a traffic lane. Thus, these two objects 2, 3 can be evaluated together as boundaries of a traffic lane.

Figure 3:
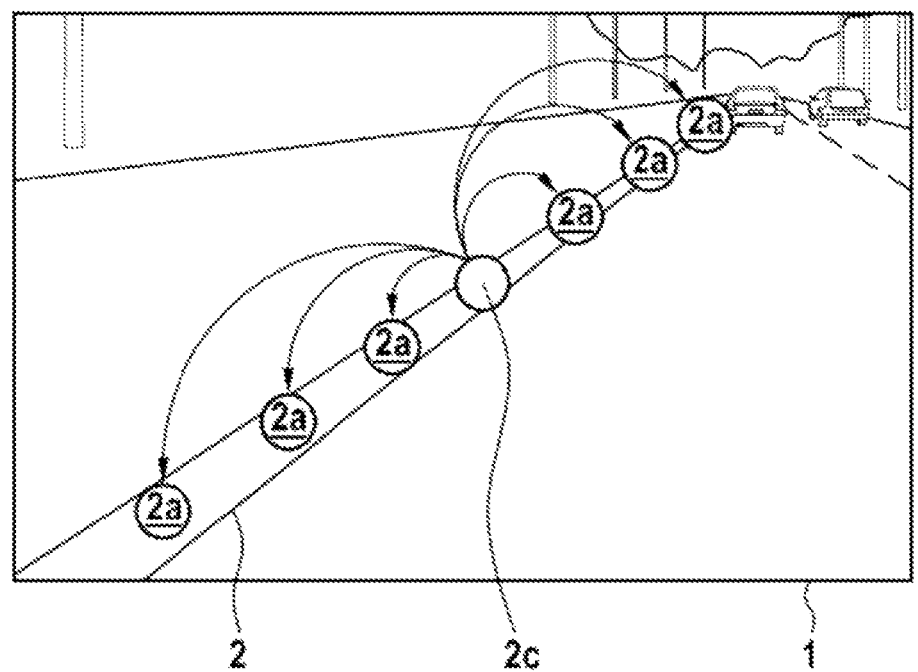
FIG. 3 shows additional exemplary identified points 2a belonging to the linear object 2.

FIG. 3 shows examples of coordinates 2a which the regression 5 has identified for the double continuous traffic lane boundary as linear object 2. With these coordinates 2a, starting from the center point 2c of this object 2, its course 2b can be extrapolated in the entire input image 1.

Figure 4:
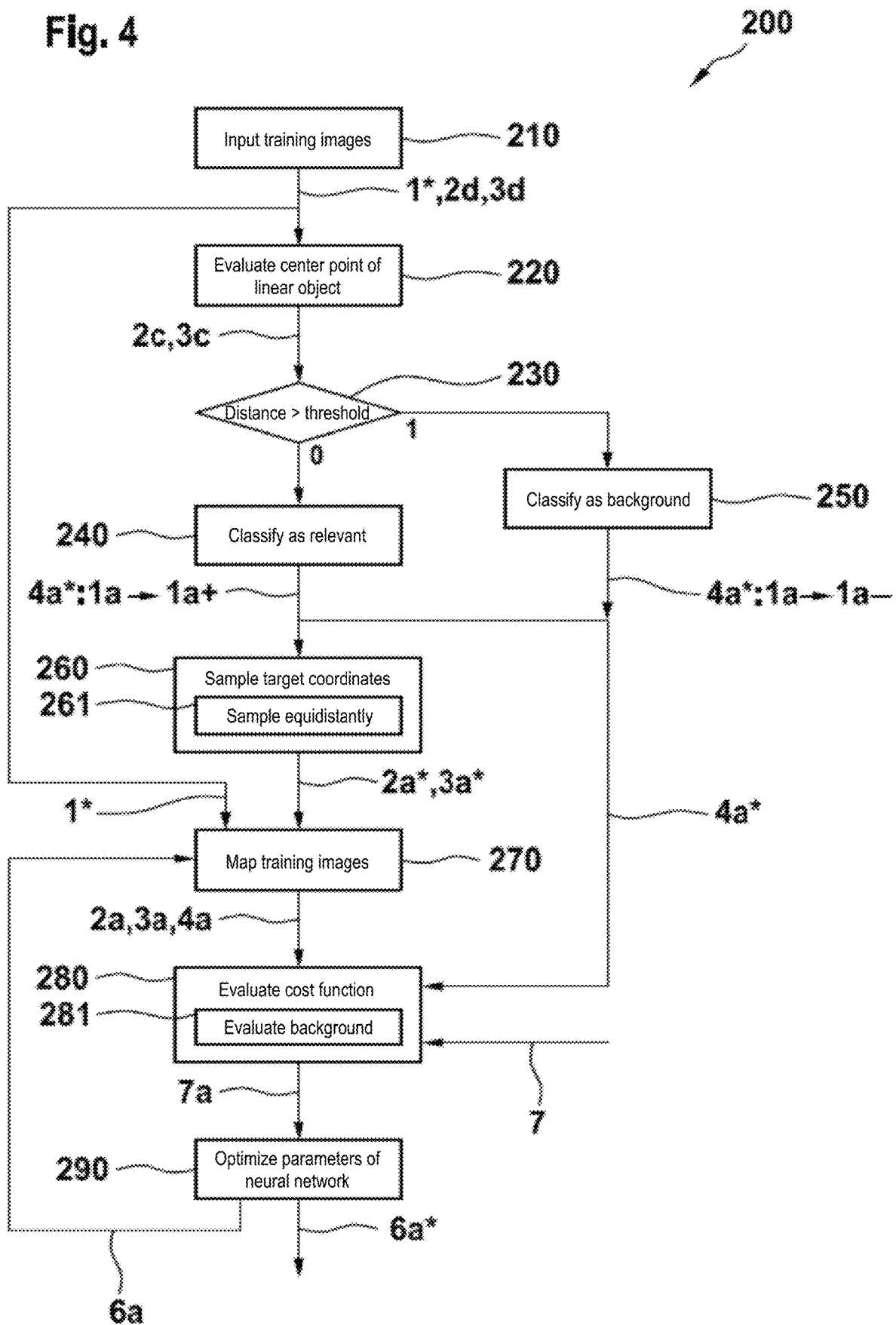
FIG. 4 shows an exemplary embodiment of the method 200 for training a neural network 6.

FIG. 4 is a schematic flow diagram of an exemplary embodiment of the method 200 for training a neural network 6 for use in the previously described method 100.

In step 210, training input images 1* with linear objects 2, 3 are provided. These training input images 1* are labeled with points 2d, 3d, through which the respective linear object 2, 3 passes.

In step 220, the center point 2c, 3c of the respective linear object 2, 3 is evaluated from the points 2d, 3d through which each linear object 2, 3 passes in the training input image 1*.

In step 230, for each of the specified regions 1a*, such as cells arranged in a grid, of the training input image 1* it is checked whether the distance of the center point of the respective region 1a* from the center point 2c, 3c of the linear object 2, 3 exceeds a specified threshold value. If this is the case (truth value 1), the relevant region 1a* receives a target classification 4a* as background 1a− in step 250. Otherwise (truth value 0), the relevant region 1a* receives a target classification 4a* as a relevant region 1a+ in step 240.

In step 260, for the relevant regions 1a+ along the course of the linear object 2, 3, target coordinates 2a*, 3a* of points through which the linear object 2, 3 passes are sampled relative to a reference point of the relevant region 1a+. This can be carried out in particular equidistantly according to block 261.

In step 270, the training input images 1* are mapped by the neural network 6 to classification scores 4a and coordinates 2a, 3a of points.

In step 280, a predefined cost function 7 is used to measure the extent to which the classification scores 4a are consistent with the target classification 4a* and the coordinates 2a, 3a of points are consistent with the target coordinates 2a*, 3a*. In particular, according to block 281, for example, the cost function 7 can evaluate regions 1a* with a target classification 4a* as background 1a− only on the basis of the comparison of the classification scores 4a with this target classification 4a*.

In step 290, parameters 6a, which characterize the behavior of the neural network 6, are optimized with the goal that the evaluation 7a by the cost function 7 is expected to improve as further training input images 1* are processed with the neural network 6. The fully trained state of the parameters 6a is indicated by the reference sign 6a*.

What is claimed is:

1. A method for detecting at least one linear object in an input image, the method comprising:

feeding at least one of the input image and an extract of the input image to an image classifier configured to classify specified regions of the at least one of the input image and the extract of the input image, in each case at least into (i) relevant regions, a center point of which is located within a threshold distance from a center point of at least one linear object passing through the respective region, and (ii) background regions, a center point of which is not located within the threshold distance from the center point of the at least one linear object passing through the respective region;

acquiring, for the relevant regions, coordinates from a regression, which indicate at least one local course of the at least one linear object in the relevant regions; and evaluating by extrapolation, based on the coordinates, a course of the at least one linear object in an entirety of the input image.

2. The method according to claim 1, wherein the coordinates comprise location coordinates of points through which the at least one linear object passes.

3. The method according to claim 1 further comprising:
aggregating the coordinates acquired for a plurality of the relevant regions to form the course of the at least one linear object in the entirety of the input image.

4. The method according to claim 1 further comprising:
evaluating the course of the at least one linear object in the entirety of the input image consisting of the coordinates acquired for the relevant region of the relevant regions that has received a highest classification score as a relevant region.

5. The method according to claim 1, wherein the at least one linear object comprises at least one of (i) one of a carriageway boundary, a traffic lane boundary, and a guideline that is marked on a lane by at least one of coloring and a row of studs, (ii) a structural boundary of a traffic line, and (iii) a stop line in front of one of a stop sign and a traffic light.

6. The method according to claim 1, wherein the image classifier further classifies the specified regions of the at least one of the input image and the extract of the input image into different types of relevant regions that correspond to different types of linear objects.

7. The method according to claim 1, wherein the image classifier and the regression are embodied by a shared neural network.

8. The method according to claim 1 further comprising:
in response to two linear objects being detected in the input image that run parallel to each other at a distance compatible with a width of a traffic lane, evaluating the two linear objects as boundaries of a traffic lane.

9. The method according to claim 1 further comprising:
determining a control signal based on the course of the at least one linear object in the entirety of the input image; and controlling a vehicle with the control signal.

10. The method according to claim 1, wherein the method is carried out by a computer program containing machine-readable instructions.

11. The method according to claim 10, wherein the computer program is stored on a non-transitory machine-readable data carrier.

12. A method for training a neural network, the method comprising:
providing training input images with linear objects, the training input images being labeled with points through which each respective linear object of the linear objects passes;

evaluating, based on the points through which each respective linear object of the linear objects passes, a center point of the respective linear object in the training input image;

assigning specified regions of the training input images a target classification (i) as a relevant region in response to a distance of a center point thereof from the center point of a respective linear object of the linear objects not exceeding a specified threshold, and (ii) otherwise as background;

sampling, for each respective relevant region of the relevant regions, along a course of a respective linear object of the linear objects, target coordinates of the points through which the respective linear object passes relative to a reference point of the respective relative region;

mapping, with the neural network, the training input images to classification scores and coordinates of points;

measuring, using a specified cost function, an extent to which the classification scores are consistent with the target classification and an extent to which the coordinates of points are consistent with the target coordinates; and optimizing parameters that characterize a behavior of the neural network with a goal that evaluation by the cost function will improve as further training input images are processed with the neural network.

13. The method according to claim 12, wherein the cost function is configured to evaluate regions with a target classification as background only based on a comparison of the classification scores with the target classification.

14. The method according to claim 12, the sampling further comprising:
equidistantly sampling the points through which the respective linear object passes.

15. A computer having a computer program for detecting at least one linear object in an input image, the computer program being stored on a non-transitory machine-readable data carrier, the computer being configured to execute the computer program to:
feed at least one of the input image and an extract of the input image to an image classifier configured to classify specified regions of the at least one of the input image and the extract of the input image, in each case at least into (i) relevant regions, a center point of which is located within a threshold distance from a center point of at least one linear object passing through the respective region, and (ii) background regions, a center point of which is not located within the threshold distance from the center point of the at least one linear object passing through the respective region;

acquire, for the relevant regions, coordinates from a regression, which indicate at least one local course of the at least one linear object in the relevant regions; and evaluate by extrapolation, based on the coordinates, a course of the at least one linear object in an entirety of the input image.

* * * * *